3,314,461
FROZEN MEAT SLICER HAVING TRANSMISSION WITH IRRATIONAL RATIO
Kurt Einar Sixten Larsson, Johanneshov, Sweden, assignor, by direct and mesne assignments, to Louis A. Bettcher, Amherst, Ohio
Filed Apr. 6, 1964, Ser. No. 357,673
Claims priority, application Sweden, Apr. 10, 1963, 4,029/63
2 Claims. (Cl. 146—105)

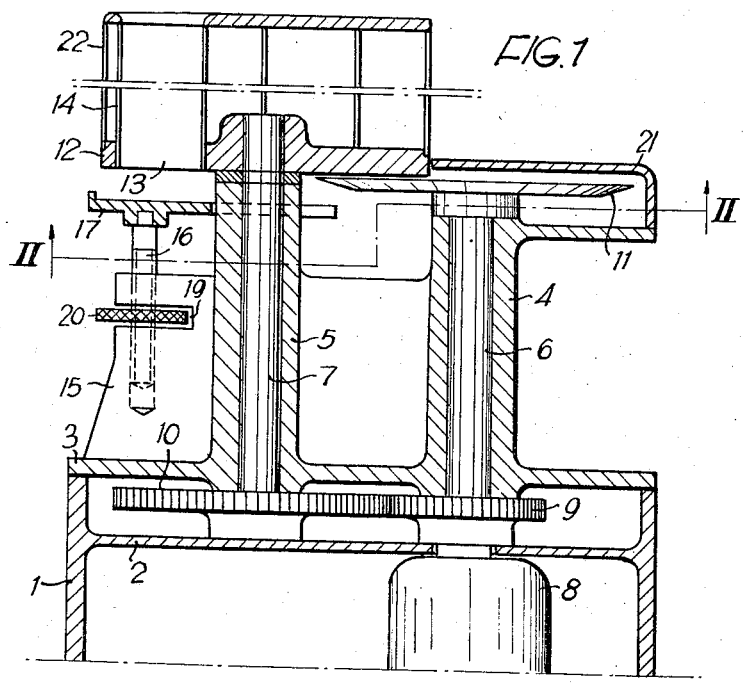
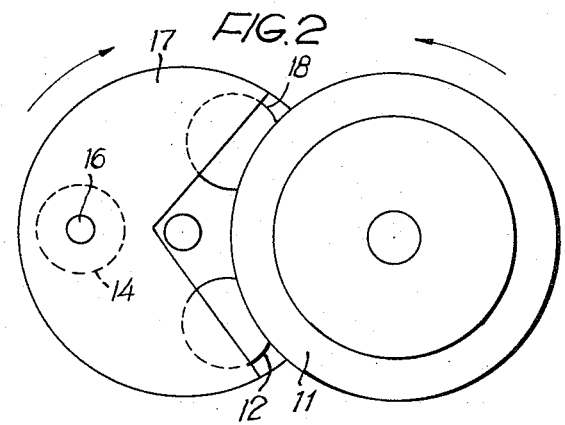

The present invention concerns a device for cutting meat, especially frozen or bony meat, into slices.

In the modern meat industry the development runs in such a direction that the goods more and more are prepared centrally and delivered to the retailers in cut and packed condition. This fact increases the need of machines which rapidly and economically can prepare uniform products from different raw materials.

However, up till now no machine has been developed, which in a satisfactory and economical way can cut hard frozen or bony meat, for instance ribs, into slices. This mostly depends on the hardness of the frozen and bony meat, and on account thereof meats of this sort are generally treated with saw or axe which makes a mechanical treatment difficult.

The aim of the present invention is to set aside this disadvantage and this is mainly achieved by aid of a machine of the stated type, which is characterized by a rotatable magazine for a number of pieces of meat, which magazine is adapted to present the pieces of meat one after the other to a rotatable knife, the axes of rotation of said magazine and said knife being parallel and their direction of rotation having the same direction within the working zone.

If the knife and the magazine in a device according to the invention are driven in such a way, that the relation between the number of revolutions forms a rational number, a number of points on the periphery of the knife depending on the transmission ratio and the number of meat pieces in the magazine will always first be brought into contact with the frozen meat or the bone of the rib, so that the knife will be exposed to especially great wear in said points. This can result in the forming of notches in the knife edge and the motion of the machine can become uneven.

To avoid this the machine according to the invention is constructed in such a way that the transmission ratio between the magazine and the knife is adapted in such a way in relation to the number of meat pieces present in the magazine that the contact points between the meat pieces and the knife travel along the knife edge.

An embodiment of the invention will in the following be described in detail with reference to enclosed drawing, in which FIG. 1 is a vertical section through the machine and FIG. 2 is a section mainly after the line II—II in FIG. 1 as seen from below.

The machine according to the embodiment shown comprises a support 1 with a horizontal wall 2 at some distance above the top edge of the support. Above said wall 2 and spaced therefrom a lid 3 is provided which carries two parallel vertical bearing bushes 4 and 5 each of which receives a shaft 6 and 7, respectively. One 6 of these shafts extends through an opening in the walls 2 and is connected to a motor 8 arranged below said wall. The lower free end of the other shaft 7 is journalled in the wall 2 and in the space between the lid 3 and the wall 2 a gear wheel 9 and 10 is keyed to each one of the shafts 6 and 7, respectively. The gear wheels 9 and 10 mesh with each other and the transmission thus formed is completely enclosed in the space between the wall 2 and the lid 3.

In its free top end one 6 of the shafts carries a knife 11 formed as a circular disc and rotatable in a horizontal plane. The other shaft 7 carries in its free top end a circular disc 12, which is rotatable in a horizontal plane spaced a short distance above the rotation plane of said knife 11. Said disc 12 is provided with one or several openings 13 positioned at such a distance from the axis of rotation of said disc 12 that said openings completely pass over the knife 11 when said disc rotates.

In each of the openings 13 a horizontal shaft 14 of sheet metal is fastened, so that said disc 12 together with said shafts form a revolver magazine by aid of which a number of frozen meat pieces or ribs introduced into said shafts one after another are presented to said knife 11.

The lid 3 is provided with a support flange 15 for the bearing bushes 4 and 5 and said support flange 15 is furthermore provided with a vertical hole in which a bolt 16 is introduced. In the free top end this bolt carries a horizontal table 17 serving as a support for the pieces of meat in the shafts 14 of the magazine. The table 17 is formed as a circular disc with a sector-like incision 18 into which the knife 11 extends. The distances between the edges of the sector-like incision and the periphery of the knife 11 should be much smaller than the peripheral extent of each opening 13 in the disc 12, so that a piece of meat received in a shaft 14 does not have any possibility to fall down in the gap between the table 17 and the knife 11.

The support flange 15 is furthermore provided with a horizontal slit 19 extending some distance past the boring in said flange and a knurled not 20 threaded onto said belt 16 is retained axially immovable in said slot. By turning the knurled nut 20 said bolt 16 and said table 17 can thus be axially adjusted, thereby changing the distance between the top surface of said table 17 and the rotation plane of said knife 11 and thus changing the thickness of the slice to be cut off.

The part of the knife 11 which is not covered by the disc 12 is enclosed in a protecting mantel 21 which is easy to remove and the shafts 14 are also surrounded by a protecting mantel 22, the two openings of said shafts 14 however, being left open so that new pieces of meat without hindrance can be inserted into said shafts. This protecting mantle 22 is also easy to remove so that the different parts of the machine are accessible for cleaning purposes.

The machine described above works in the following way:

When the motor 8 is energized, for instance by electric current, the knife 11 is rotated and via the gear wheels 9 and 10 the disc 12 is driven in the opposite direction.

The opening or openings 13 in the disc 12 will thus travel over the rotating knife 11. The lower ends of frozen pieces of meat or pieces of rib introduced into said shafts 14 rest again the table 17 and since same is positioned at a distance below the rotation plane of said knife 11 determined by the adjustment device 16, 20 each of the pieces of meat will in turn be moved towards the edge of said knife 11 in such a way, that same cuts off a slice at the lower end of the piece of meat, the thickness of said slice being determined by the above distance.

Within the working zone the pieces of meat are moved in the same direction as the knife 11 which results in a smooth run of the machine.

When the knife 11 first cuts into the piece of meat the bottom end thereof rests against said table 17 and during the cutting itself the piece of meat rests partly against the plane or slightly concave top surface of said knife, so that it maintains its axial position in said shaft 14. When the slice is completely severed from the piece of meat it falls down on a chute and is carried out of the machine, and when the piece of meat has completely passed the knife it descends until it rests upon said table 17 in right position for the cutting of a new slice. In each rotation the machine thus cuts off as many slices as there are shafts in the magazine.

In the embodiment shown the feeding of the pieces of meat in the shafts is accomplished by aid of the force of gravity and this way of feeding is preferable as it saves the costs of special feeding mechanism and the machine becomes more easy to handle and to clean. However, nothing prevents that the pieces of meat are fed through the shafts by aid of a mechanical device as for instance a spring loaded plunger or the like.

As is evident from FIG. 1 the knife 11 is rotated with a higher number of revolutions than the magazine, which is natural as the best cutting result is achieved when the knife edge is moved in relation to the meat piece. Assuming that the knife 11 is rotated with twice a number of revolution of the magazine and same contains three shafts, any points in the same position within the shafts will always meet the knife edge in three points positioned on the periphery thereof and spaced 120° from each other. As for instance the bone of the rib usually is positioned in the same place in the meat, the knife will thus always commence the treatment of the hardest part with the same three portions of the edge, so that said edge portions will wear more rapidly than the rest of the knife edge. After sometime the knife losses its circular form and the run of the machine becomes uneven. The same condition exists at each ratio of transmission forming a rational number since a number of points spaced along the knife edge, which number is dependent of said ratio and the number of shafts in the magazine, are subjected to said particularly hard wear. The gear wheels 9 and 10 are therefore so constructed that the ratio of transmission, i.e., the rotation of one as compared with the other, forms an irrational number whereby above mentioned contact points will travel along the knife edge so that the edge is subjected to even wear.

By aid of above described device a fast and economical cutting of meat into slices is provided, said machine being especially suited for treatment of frozen or bony meat. The machine is furthermore simple to handle and easy to clean, and the meat subjected to treatment is protected from contaminations for instance by oil from the driving means of the machine.

What is claimed is:

1. A cutting device especially suitable for cutting frozen or bony meat products and the like into slices, said device including a circular cutting blade supported in a predetermined plane for rotation about a central axis, a magazine having not more than three spaced stations for holding separate pieces of meat to be cut, means to move the magazine and the rotating cutting blade relative to each other in an endless path with a portion of the meat in the plane of the cutting blade, and a tranmission connecting the magazine and the cutting blade, said transmission having interengaging means that define a fixed ratio of revolutions between the magazine and the cutting blade to cause the cutting blade to initially contact the meat at progressively different locations about the periphery of the blade so that wear on the blade is spread over substantially the entire periphery.

2. A device for cutting meat products and the like, especially frozen or bony meat, into slices, said device including a circular cutting blade supported in a predetermined plane for rotation about a central axis, a magazine having not more than three spaced stations for holding separate pieces of meat to be cut, means to move the magazine and the rotating cutting blade relative to each other in a circular path with a portion of the meat in the plane of the cutting blade, and a transmission connecting the magazine and the cutting blade, said transmission having transmission members that define a ratio between the revolutions of the magazine and the cutting blade in the circular path that is an irrational number, whereby wear on the blade is spread over substantially the entire periphery of the blade.

References Cited by the Examiner
UNITED STATES PATENTS

| | | | |
|---|---|---|---|
| 2,328,712 | 9/1943 | Donke | 144—21 |
| 2,341,052 | 2/1944 | Lurmann et al. | 146—105 XR |
| 3,194,289 | 7/1965 | Lundell | 146—105 |

WILLIAM W. DYER, JR., *Primary Examiner.*

W. GRAYDON ABERCROMBIE, *Examiner.*